United States Patent
Murthy et al.

(10) Patent No.: US 6,810,794 B2
(45) Date of Patent: Nov. 2, 2004

(54) CONTINUOUS VIBRO FLUIDIZED BED ROASTER USING FLUE GAS

(75) Inventors: Kestur Venkatesh Murthy, Mysore (IN); Sankaram Thadathil Gangadharan Jayaprakashan, Mysore (IN); Raju Ezhil Murugan, Mysore (IN)

(73) Assignee: Kumaran & Sagar, New Delhi (IN)

( * ) Notice: Subject to any disclaimer, the term of this patent is extended or adjusted under 35 U.S.C. 154(b) by 0 days.

(21) Appl. No.: 10/397,922

(22) Filed: Mar. 26, 2003

(65) Prior Publication Data

US 2004/0187709 A1 Sep. 30, 2004

(51) Int. Cl.[7] .............................. A23L 1/00; A47J 37/00
(52) U.S. Cl. ........................... 99/355; 99/450; 99/476; 99/483
(58) Field of Search .................. 99/340, 348, 339, 99/353, 450, 355, 444–446, 400, 401, 483, 352, 467–472, 473–479, 577, 516, 612, 286; 34/137, 233, 225, 594, 549, 576; 126/25 R, 9 R; 165/94, DIG. 85; 426/481, 482, 467, 469

(56) References Cited

U.S. PATENT DOCUMENTS

| | | | | |
|---|---|---|---|---|
| 3,615,668 A | * | 10/1971 | Smith et al. | 426/467 |
| 3,763,766 A | * | 10/1973 | Smith, Jr. | 99/468 |
| 4,169,164 A | * | 9/1979 | Hubbard et al. | 99/474 |
| 4,270,469 A | * | 6/1981 | Gall | 110/245 |
| 4,322,447 A | * | 3/1982 | Hubbard | 426/467 |
| 4,860,461 A | * | 8/1989 | Tamaki et al. | 99/286 |
| 5,159,764 A | * | 11/1992 | Wireman et al. | 99/483 |
| 5,185,171 A | * | 2/1993 | Bersten | 99/474 |
| 5,230,281 A | * | 7/1993 | Wireman et al. | 99/483 |
| 5,651,191 A | * | 7/1997 | Walunas et al. | 34/236 |
| 6,190,625 B1 | * | 2/2001 | Jha et al. | 423/53 |
| 6,349,633 B1 | * | 2/2002 | Inakuma et al. | 99/348 |
| 6,634,283 B2 | * | 10/2003 | Prendiville et al. | 99/570 |

* cited by examiner

Primary Examiner—Timothy F. Simone
(74) Attorney, Agent, or Firm—Harness, Dickey & Pierce, P.L.C.

(57) ABSTRACT

A continuous vibro fluidized bed roaster for roasting cereals, pulses, spices, oil seeds and ready-to-eat snack foods using flue gas, said roaster comprises of a main frame (4) which houses all the parts of the machine, the vibrating deck (1) is mounted on a set of coil springs (6) which is mounted on the main frame through screw fasteners, a perforated sieve (3) and a hood (2) are mounted on the vibrating deck (1) with rubber gasket (17) for sealing the hot air from leakage, a vibratory motor (10) is mounted on the feed end of the vibratory deck for imparting vibrations to the feed material, a vibratory feeder (11) is mounted on the feed side of the vibratory deck (1) for feeding the raw material in to the roaster through a hopper (20).

19 Claims, 1 Drawing Sheet

CONTINUOUS VIBRO FLUIDIZED BED ROASTER USING FLUE GAS

FIELD OF THE INVENTION

The present invention relates to a continuous vibro fluidized bed roaster using flue gas, for roasting/toasting of cereals, pulses, spices, oil seeds and ready to-eat snack foods. The device of the present invention is particularly useful for roasting/toasting cereals, pulses, spices, oil seeds and ready to-eat snack foods which enhances the organoleptic properties. The product processed by using the roaster has uniform color, moisture and other sensorial properties, and the material is process ed under hygienic conditions in a continuous manner.

BACKGROUND AND PRIOR ART DESCRIPTION TO THE INVENTION

The patent search showed batch type roasters are patented in Federal Republic of Germany, patent No. DE 3116723 C2. There is only one report where vibratory mode was employed in fluidized bed roaster (Weyell, 1997) Patent No. 0039-4653. This unit from Vibro (Germany), was used for roasting hazelnuts, desiccated coconut etc. However, this unit happens to be a batch type unit.

Presently the roasters are of batch type, continuous sand roasters, rotary type roasters and air jet roasters. The major problems in these roasters are non uniform roasting, color, scorched and blackened particles, sand and ash entrapment after processing, which leads to poor quality product. These units are tedious in operation and the operator has to work under the direct influence of smoke and flame and sand roasters are not suitable for roasting of spices like chilies, coriander etc. In case a suitable device is made available for continuous roasting of cereals, pulses, spices, oil seeds and ready to-eat snack foods which would result in reduction in hardship, clean and hygienic end product free from sand and ash and will have uniform color of roasting etc. Realizing the importance and necessity, The Central Food Technological Research Institute, Mysore has successfully developed a device for roasting/toasting cereals, pulses, spices, oil seeds and ready to-eat snack foods.

Hitherto the process of roasting/toasting of cereals, pulses, spices, oil seeds and ready to-eat snack foods is done either in rotating units or conveyorised units. Rotary units have the standard ovens for roasting all types of flakes in break fast food industry. Flakes are difficult to roast in a fixed position on flat board leading to uneven product color. Where as rotary ovens suspend flakes in heated air which heats all surfaces evenly and results in uniform roasting and color. Rotary units consist of an insulated outer shell, with an inner-rotating cylinder. The inner shell is made up of plain carbon steel and the outer shell, is of mild steel and insulated suitably. Perforated inner shell is used for large flakes as corn, wheat, where as non-perforated cylinders is employed for handling small product. An important feature of rotary type roasting units is the presence of lifters inside the inner cylinders for uniform mixing of the product. Band roasters are used for large products of thickness 6–20 mm and for those that will crumble in the drum. These are quite simple units in which conveyor moves through the oven chamber and can be direct or indirect fired. A more efficient roaster is a jet zone unit, in which hot air is forced through the nozzle, which directs them as high velocity jets on to the product. This result in more uniform product than conveyor roasted products. But jet zone unit is not suitable for roasting of oil seeds, breakfast foods etc., as the air jet of high velocity and would damage the final shape of the product.

The drawbacks of using the above types of roasters are:

There is no uniformity in roasting.

Cereals, pulses, oil seeds, spices and breakfast foods cannot be roasted in a single device.

Roasting of unsorted material is not possible.

The roasted material will not have uniform color.

The product will have scorched/blackened particles.

The end product will be contaminated with sand and ash.

The operation is tedious and the operator has to work under the threat of flame and smoke.

Sand roasters are not suitable for spices like chilies, coriander etc.

The jet zone roaster would damage the products final shape and is not suitable for breakfast foods and spices like chilies.

Incase a device is made available for roasting/toasting cereals, pulses, spices, oil seeds and ready to-eat snack foods continuously, would result in reduction in human drudgery, clean and hygienic end product free from sand, ash and will have uniform color and uniform roasting.

OBJECTS OF THE PRESENT INVENTION

The main object of the present invention is to provide a continuous vibro fluidized bed roaster for roasting/toasting of cereals, pulses, spices, oil seeds and ready to-eat snack foods continuously, using flue gas.

Another object is to roast the cereals, pulses, spices, oil seeds and ready-to-eat snack foods hygienically through mechanized operations, using the continuous vibro fluidized bed roaster using flue gas.

Still another object is to provide a device to produce roasted cereals, pulses, spices, oil seeds and ready-to-eat snack foods of uniform color, texture and other sensorial properties.

Still another object of the present invention is to reduce manual drudgery.

Yet another object is to increase productivity.

Still another object is to provide a device capable of working with a wide range of material to be roasted.

BRIEF DESCRIPTION OF THE ACCOMPANYING DRAWING

In the drawings accompanying this specification,

SUMMARY OF THE INVENTION

Figure 1:
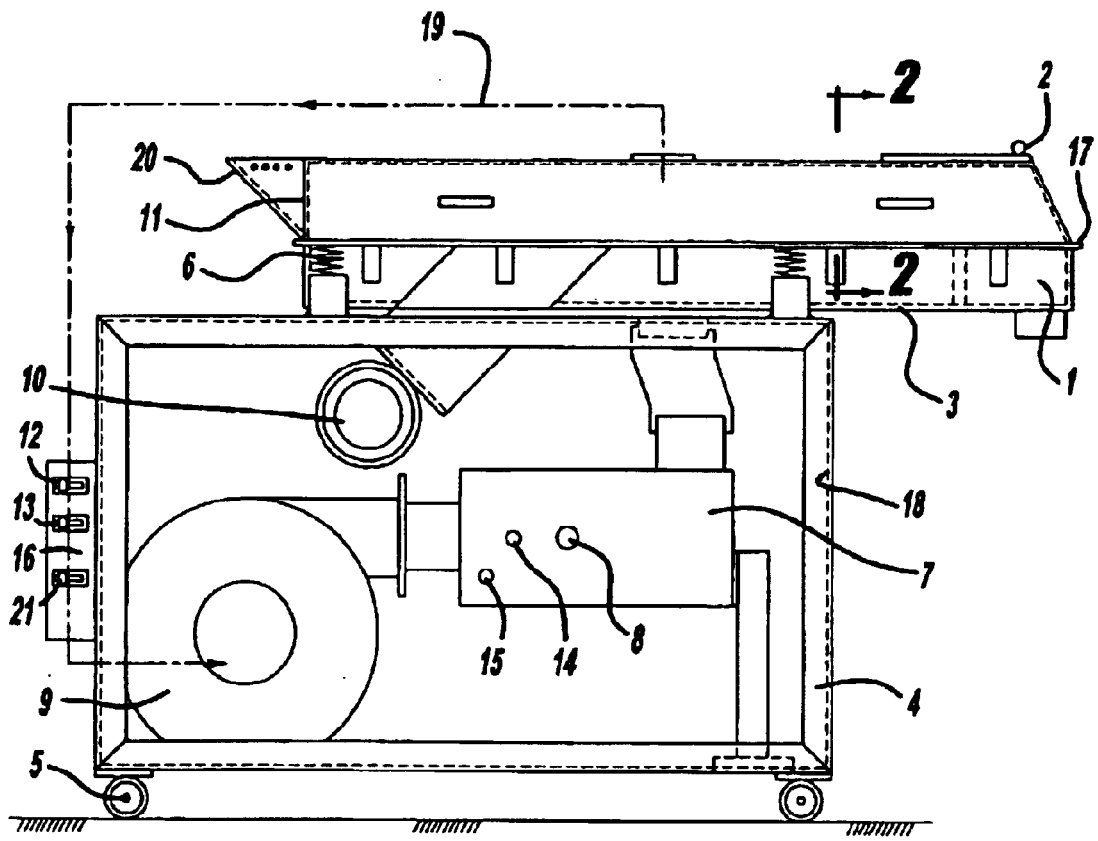
FIG. 1 represents the device of the present invention according to an embodiment. The device is useful for roasting/toasting of cereals, pulses, spices, oil seeds and ready to-eat snack foods.

Accordingly, the present invention provides a continuous vibro fluidized bed roaster for roasting/toasting cereals, pulses, spices, oil seeds and ready-to-eat snack foods using flue gas, said roaster comprises of a main frame (4) for housing the parts of the roaster; a vibrating deck (1) being mounted on top of the main frame through a set of coil springs (6); a perforated sieve (3) and a hood (2) are mounted on the vibrating deck (1) using mounting means (17) for sealing and preventing leakage of hot air; a vibratory motor (10) being mounted on a feed end of the vibratory deck for imparting vibrations; the vibratory deck being provided with a vibratory feeder (11) and a hopper (20) on the feed end for feeding the raw material in to the roaster, a blower (9) being mounted near the vibratory feeder for supplying air to a combustion chanber (7); the combustion chamber being provided with a burner (8) for heating the incoming air, and the combustion chamber being connected either directly or through an inlet duct to the vibrating deck for supplying hot air; a variable quantity input feeder (12) for varying the feed rate of the raw material fed in to the vibrating deck and a variable speed drive (13) for varying the residence time of travel of the raw material inside the vibrating deck, and optionally a return duct (19) being placed between the hood and suction end of the blower for re-circulating the waste air.

DETAILED DESCRIPTION OF THE INVENTION

The present invention relates to a continuous vibro fluidized bed roaster for roasting/toasting cereals, pulses, spices, oil seeds and ready-to-eat snack foods using flue gas, said roaster comprises of a main frame (4) for housing the parts of the roaster; a vibrating deck (1) being mounted on top of the main frame through a set of coil springs (6); a perforated sieve (3) and a hood (2) are mounted on the vibrating deck (1) using mounting means (17) for sealing and preventing leakage of hot air; a vibratory motor (10) being mounted on a feed end of the vibratory deck for imparting vibrations; the vibratory deck being provided with a vibratory feeder (11) and a hopper (20) on the feed end for feeding the raw material in to the roaster; a blower (9) being mounted near the vibratory feeder for supplying air to a combustion chanber (7); the combustion chamber being provided with a burner (8) for heating the incoming air, and the combustion chamber being connected either directly or through an inlet duct to the vibrating deck for supplying hot air; a variable quantity input feeder (12) for varying the feed rate of the raw material fed in to the vibrating deck and a variable speed drive (13) for varying the residence time of travel of the raw material inside the vibrating deck, and optionally a return duct (19) being placed between the hood and suction end of the blower for re-circulating the waste air.

An embodiment of the present invention relates to a continuous vibro fluidized bed roaster, wherein the roaster further comprises of a solenoid valve (14) mounted on the main frame(4) for regulating the supply of liquid propane gas, otherwise referred to herein as LPG, the burner and also to close the LPG supply in case of electrical power failure.

Another embodiment of the present invention relates to a continuous vibro fluidized bed roaster, wherein the roaster further comprises of a photo sensor (15) provided inside the combustion chamber for sensing the burning flame during the operation and indicating name failure.

Yet another embodiment of the present invention relates to a continuous vibro fluidized bed roaster, wherein the roaster further comprises of a temperature indicator (21) for measuring inlet temperature of the hot air admitted.

Still another embodiment of the present invention relates to a continuous vibro fluidized bed roaster, wherein the roaster further comprises of an electrical panel (16) being mounted on the main frame for housing all the required electrical controls.

Another embodiment of the present invention relates to a continuous vibro fluidized bed roaster, wherein the roaster is covered by a set of covers (18) on all its sides.

Still another embodiment of the present invention relates to a continuous vibro fluidized bed roaster, wherein the complete machine is mounted on a set of castor wheels (5) for easy movement of the roaster to the required place.

Yet another embodiment of the present invention relates to a continuous vibro fluidized bed roaster, wherein the coil springs are mounted on the main frame through screw fasteners.

Still another embodiment of the present invention relates to a continuous vibro fluidized bed roaster, wherein the mounting means (17) is a rubber gasket.

Another embodiment of the present invention relates to a continuous vibro fluidized bed roaster, wherein the materials used for construction of the roaster are of stainless steel.

Still another embodiment of the present invention relates to a continuous vibro fluidized bed roaster, wherein the roaster is optionally provided with additional means such as swing bolts and nuts for fixing the hood.

Yet another embodiment of the present invention relates to a continuous vibro fluidized bed roaster, wherein the hood is in trapezoidal shape and is made of stainless steel.

Still another embodiment of the present invention relates to a continuous vibro fluidized bed roaster, wherein the hood is optionally provided with grooved flats, which helps to fasten the hood with the vibrating deck.

Still another embodiment of the present invention relates to a continuous vibro fluidized bed roaster, wherein the vibrating deck is made of stainless steel.

Yet another embodiment of the present invention relates to a continuous vibro fluidized bed roaster, wherein the vibratory motor (10) is a variable speed motor for varying the frequency of vibration of the deck.

Still another embodiment of the present invention relates to a continuous vibro fluidized bed roaster, wherein the blower is a variable speed blower for varying the air velocity of fluidization of different raw material.

Yet another embodiment of the present invention relates to a continuous vibro fluidized bed roaster, wherein the rubber gasket is used for sealing the airflow between the decks.

Still another embodiment of the present invention relates to a continuous vibro fluidized bed roaster, wherein the variable quantity input feeder (12) to vary the feed rate of the raw material is a rheostat.

More particularly, the present invention provides a continuous vibro fluidized bed roaster using flue gas, comprises of a main frame (4) which houses all the parts of the machine, the vibrating deck (1) is mounted on a set of coil springs (6) which is mounted on the main frame through screw fasteners, a perforated sieve (3) and a hood (2) are mounted on the vibrating deck (4) with rubber gasket (17) for sealing the hot air from leakage, a vibratory motor (10) is mounted on the feed end of the vibratory deck for imparting vibrations to the feed material, a vibratory feeder (11) is mounted on the feed side of the vibratory deck (4) for feeding the raw material in to the roaster through a hopper (20). A LPG burner (8) is fastened to the combustion chamber (7) using fasteners, a solenoid valve (14) mounted on the main frame (4) for regulating the LPG supply to the burner and also to close the LPG supply incase of electrical power failure with a signal for flame failure from the photo sensor (15), a blower (9) generates the air needed for the reducing the flue temperature is mounted at the end of the on the vibratory feeder (11) on to the main frame (4), a return duct (19) connects the hood (2) and the suction end of the blower (9), a temperature indicator is (21) is used for measuring the inlet temperature of the hot air admitted in to the roaster, an electrical panel (16) is mounted at the end of the main frame for housing all the required electrical controls and variable speed drive (13) for varying the residence time of travel of the raw material, a rheostat (12) for varying the feed rate of the raw material fed in to the vibrating deck, the roaster is covered by a set of covers (18) on all its sides, the complete machine is mounted on a set of castor wheels (5) for easy movement of the roaster to the required place, the materials of construction of the roaster are preferably of stainless steel but this shall not restrict the use of other materials as well.

Figure 2:
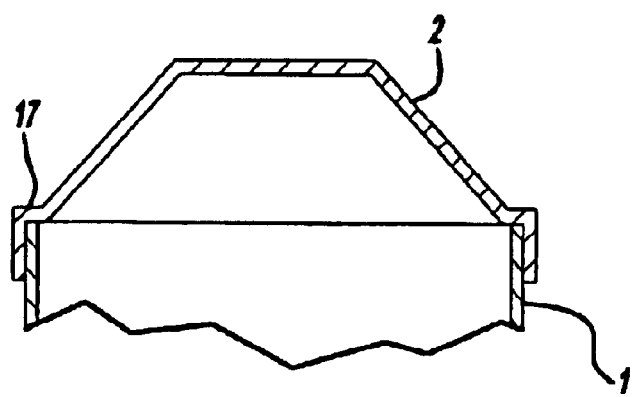
FIG. 2 is a cross-sectional view taken along line 2—2 of FIG. 1.

In another embodiment of the present invention, the device has a hood at the top portion of the deck as best depicted in FIG. 2, and may have additional means such as swing bolts and nuts for fixing. The hood may preferably be in trapezoidal shape and made of stainless steel. This however, does not restrict the invention as any alternate shape or material can used. The hood may be 20 provided with grooved flats, which helps to fasten the hood with the vibrating deck.

Yet another embodiment of the present invention, the device has a vibrating deck made of stainless steel as the preferred material. The deck would facilitate mounting of perforated sieve using rubber gaskets.

Still another embodiment of the present invention, the device has a variable speed vibrating motor for varying the frequency of vibration of the deck.

Yet another embodiment of the present invention, the device has a variable speed blower to vary the air velocity of Fluidization of different raw material.

Yet another embodiment of the present invention has a rubber gasket for scaling the airflow between the decks.

Still another embodiment of the present invention, has a variable quantity feeder to vary the feed rate of the raw material.

Yet another embodiment of the present invention has a photo-sensor inside the combustion chamber to sense the burning flame during the operation.

Yet another embodiment of the present invention has a solenoid valve to regulate the LPG supply to the burner and also to act as safety valve against electrical power failure through the photo sensor.

Still another embodiment of the present invention has a combustion chamber with a LPG burner for generating hot air, required for roasting.

Yet another embodiment of the present invention has a main frame mounted on castor wheels, which supports all the parts of the roaster.

Still another embodiment of the present invention has a panel board to house all the electrical controls of the device.

Yet another embodiment of the present has a return duct to recirculate the hot air to enable higher thermal efficiency.

Yet another embodiment of the present invention has covers to cover all the sides of the roaster.

We propose a device useful for roasting I toasting of cereals, pulses, spices, oil seeds and ready to-eat snack foods, for the first time according to this invention.

The invention is based on our finding that roasting/toasting of cereals, pulses, spices, oil seeds and ready to-eat snack can be of uniform roasting, color and other sensorial properties under hygienic conditions using this device.

The raw material is fed in to the roaster by using a vibratory feeder mounted on the main frame. The feed rate of the input raw material can be controlled by using a variac housed inside the panel board. The material is roasted to its characteristic flavour during its travel along the perforated sieve. The time and temperature of roasting/toasting can be varied to suit the raw material and its initial moisture content and the roasted/toasted material is obtained at the outlet of the roasting deck. The hot air is generated in the combustion chamber of the continuous vibro Fluidized bed roaster by burning liquid petroleum gas. A blower mounted on the main frame generates a stream of air to be mixed with the flue. The generated hot air is blown across the perforated sieve mounted on the vibrating deck. Regulating the supply of LPG can control the temperature of the hot air. The vibrating deck is mounted on the main frame through helical springs. The vibration motor imparts vibrations to the deck through the eccentrically mounted dead weights. Varying the speed of the vibration motor and the position of the dead weights can control the frequency of vibration and its amplitude. The quality of roasting/toasting can be controlled by varying the frequency of vibration, by varying the amplitude of vibration and by controlling the hot air temperature.

The following examples are given by way of illustration and therefore should not be construed to limit the scope of the present invention.

EXAMPLE 1

Wheat to be roasted is fed in to the hopper mounted on to the vibratory feeder. The wheat is fed on to the perforated sieve vibrating along with the deck and hood, at a feed rate ranging between 75–100 kg/h. The air velocity has been set at 1.3–1.4 m/s, at an air temperature ranging between 300–350 degree centigrade. The residence time of roasting of wheat was set at 40–50 seconds according to the variety of the input raw material. The roasted wheat was discharged through the out let chute of the continuous vibro fluidized bed roaster and collected on to the tray. The temperature of the roasted product was 80–85 degree centigrade with the final moisture of around 4–5%.

EXAMPLE 2

The working of the roaster is explained below with particular reference to roasting of soji. The soji to be roasted is fed in to the hopper mounted on to the vibratory feeder. The soji is fed on to the perforated sieve vibrating along with the deck and hood, at a feed rate ranging between 55–60 kg/h. The air velocity has been set at 0.5–0.75 m/s, at an air temperature ranging between 280–300 degree centigrade. The residence time for roasting of soji was set at 40–45 seconds according to the variety of the input raw material., The roasted soji was discharged through the out let chute of the continuous vibro fluidized bed roaster and collected on to the tray. The temperature of the roasted product was 70–80 degrees centigrade with the final moisture of around 4–5%.

EXAMPLE 3

The working of the roaster is explained below with particular reference to roasting of vermicelli. The vermicelli to be roasted is fed in to the hopper mounted on to the vibratory feeder. The vermicelli is fed on to the perforated sieve vibrating along with the deck and hood, at a feed rate ranging between 75–80 kg/h. The air velocity has been set at 1.0–2.0 m/s, at an air temperature ranging between 270–300 degree centigrade. The residence time for roasting of vermicelli was set at 40–45 seconds. The roasted vermicelli was discharged through the out let chute of the continuous vibro fluidized bed roaster and collected on to the tray. The temperature of the roasted product was 85 degrees centigrade with the final moisture of around 5–5.5%. The roasted strands of the vermicelli were of light brown in color.

EXAMPLE 4

The working of the roaster is explained below with particular reference to roasting of cocoa bean. The cocoa bean to be roasted is fed in to the hopper mounted on to the vibratory feeder. The cocoa bean is fed on to the perforated sieve vibrating along with the deck and hood, at a feed rate ranging between 50–60 kg/h. The air velocity has been set at 1.9–2.1 m/s, at an air temperature ranging between 340–350 degree centigrade. The residence time for roasting of cocoa bean was set at 25 seconds. The roasted cocoa bean was discharged through the out let chute of the continuous vibro fluidized bed roaster and collected on to the tray. The temperature of the roasted product was 110 degrees centigrade with the final moisture of around 5–0.5%. The roasted beans were of uniform shape and texture.

The roasted product is free from contaminants like sand, ash etc. and the roasting operation is carriedout in hygienic conditions. The product obtained after roasting is uniform in color, texture and even unsorted raw materials can be used for roasting. The startup/heatup time and shutdown time of the roaster are instantaneous unlike other roasters which need at least 25–30 minutes and the hot air is recirculated through the blower. The instant heat up of heat transfer medium and recirculation of hot air increases the thermal efficiency of the roaster. The continuous vibro Fluidized roaster is suitable for roasting/toasting of the wide variety of raw material like cereals, pulses, ready to eat snack foods, oil seeds and spices, which is not possible in other types of roaster. Different types of roasters/toasters are needed for different raw materials and each has its drawbacks. The standardized process parameters for different food materials when they are roasted using the raster of the present invention are tabulated in Table 1.

The continuous vibro fluidized bed roaster is useful for roasting different varieties of cereals, pulses, spices, and oil seeds and ready to-eat snack foods of different moisture, size etc.

The roasting operation can be started or stopped by closing the feeder and by stopping the fuel supply.

The roasting process is continuous.

The required temperature of the hot air can be varied to the requirement.

The hot air temperature can be obtained with in 20–30 seconds and there is no heatup time.

The hot air is recirculated to increase the thermal efficiency.

The continuous fluidized bed roaster is provided with a photo sensor for sensing the burning flame and incase of flame failure the photo sensor will send the signal to the solenoid valve to close the supply of LPG in to the burner.

What is claimed is:

1. A continuous vibro fluidized bed roaster for roasting/toasting raw materials such as cereals, pulses, spices, oil seeds and ready-to-eat snack foods using flue gas, said roaster comprises of a main frame (4) for housing the parts of the roaster; a vibrating deck (1) being mounted on top of the main frame through a set of coil springs (6); a perforated sieve (3) and a hood (2) are mounted on the vibrating deck (1) using mounting means (17) for sealing and preventing leakage of hot air; a vibratory motor (10) being mounted on a feed end of the vibratory deck for imparting vibrations; the vibratory deck being provided with a vibratory feeder (11) and a hopper (20) on the feed end for feeding the raw material in to the roaster; a blower (9) being mounted near the vibratory feeder for supplying air to a combustion chamber, said blower including a suction end (7); the combustion chamber being provided with a burner (8) for heating the incoming air, and the combustion chamber being connected either directly or through an inlet duct to the vibrating deck for supplying hot air; a variable quantity

TABLE 1

Standardized process parameters for different Food Materials

| Sl No | Material | Air inlet Temp. °C. | Air outlet Temp. °C. | Material Temp. °C. | Residence Time Sec. | Appx. Air Velocity m/s | Expansion Ratio | Fuel Consumption Kg/h | Feed Rate Kg/h |
|---|---|---|---|---|---|---|---|---|---|
| 1 | Wheat | 350 | 230 | 130 | 45 | 2.0–3.0 | 1.77 | 2.50 | 100 |
| 2 | Soji | 310 | 150 | 110 | 40 | 1.0–1.5 | — | 2.50 | 40 |
| 3 | Cocoa | 350 | 180 | 110 | 25 | 1.9–2.1 | 1.80 | 2.50 | 50 |
| 4 | Green gram | 270 | 140 | 90 | 45 | 1.5–2.0 | — | 2.20 | 50 |
| 5 | Vermicelli | 300 | 165 | 85 | 45 | 1.0–2.0 | — | 2.50 | 80 |
| 6 | Maize | 350 | 150 | 120 | 45 | 2.0–3.0 | 11.03 | 2.50 | 25 |
| 7 | Jowar | 300 | 165 | 90 | 35 | 2.0–3.0 | 7.42 | 2.50 | 25 |

The main advantages of the present invention are:

Varied rates of roasting in terms of organoleptic properties as well as quantity can be obtained by varying the temperature of the hot air admitted to the vibrating deck.

No scorching/discoloration in the process using the device of the invention. Consequently there is no chance of non-uniformity in color.

Even unsorted grains can be used for roasting. Varying the amplitude/frequency of vibration can vary the rate of input to the deck.

input feeder (12) for varying the feed rate of the raw material fed in to the vibrating deck and a variable speed drive (13) for varying the residence time of travel of the raw material inside the vibrating deck.

2. A continuous vibro fluidized bed roaster as claimed in claim 1, wherein the roaster further comprises of a solenoid valve (14) mounted on the main frame (4) for regulating the supply of LPG to the burner.

3. A continuous vibro fluidized bed roaster as claimed in clam 1, wherein the roaster further comprises of a photo sensor (15) provided inside the combustion chamber for sensing the burning flame during the operation and indicating flame failure.

4. A continuous vibro fluidized bed roaster as claimed in claim 1, wherein the roaster further comprises of a temperature indicator (21) for measuring inlet temperature of the hot air admitted.

5. A continuous vibro fluidized bed roaster as claimed in claim 1, wherein the roaster further comprises of an electrical panel (16) being mounted on the main frame for housing all the required electrical controls.

6. A continuous vibro fluidized bed roaster as claimed in claim 1, wherein the roaster is covered by a set of covers (18) on all its sides.

7. A continuous vibro fluidized bed roaster as claimed in claim 1, wherein the complete machine is mounted on a set of castor wheels (5) for easy movement of the roaster to the required place.

8. A continuous vibro fluidized bed roaster as claimed in claim 1, wherein the coil springs are mounted on the main frame through screw fasteners.

9. A continuous vibro fluidized bed roaster as claimed in claim 1, wherein the mounting means (17) is a rubber gasket.

10. A continuous vibro fluidized bed roaster as claimed in claim 1, wherein the materials used for construction of the roaster are of stainless steel.

11. A continuous vibro fluidized bed roaster as claimed in claim 1, wherein the roaster is optionally provided with additional means such as swing bolts and nuts for fixing the hood.

12. A continuous vibro fluidized bed roaster as claimed in claim 1, wherein the hood is in trapezoidal shape and is made of stainless steel.

13. A continuous vibro fluidized bed roaster as claimed in claim 1, wherein the hood is optionally provided with grooved flats, which helps to fasten the hood with the vibrating deck.

14. A continuous vibro fluidized bed roaster as claimed in claim 1, wherein the vibrating deck is made of stainless steel.

15. A continuous vibro fluidized bed roaster as claimed in claim 1, wherein the vibratory motor (10) is a variable speed motor for varying the frequency of vibration of the deck.

16. A continuous vibro fluidized bed roaster as claimed in claim 1, wherein the blower is a variable speed blower for varying the air velocity of fluidization of different raw material.

17. A continuous vibro fluidized bed roaster as claimed in claim 1, wherein the rubber gasket is used for sealing the airflow between the decks.

18. A continuous vibro fluidized bed roaster as claimed in claim 1, wherein the variable quantity input feeder (12) to vary the feed rate of the raw material is a rheostat.

19. A continuous vibro fluidized bed roaster as claimed in claim 1, further comprising a return duct (19) located between the hood and the suction end of he blower for recirculating waste air.

* * * * *